(Model.)

J. TRUAX, D. A. CARL & W. H. LOWE.
Harness.

No. 243,658.                    Patented June 28, 1881.

Witnesses:                         Inventors:

UNITED STATES PATENT OFFICE.

JOBE TRUAX, DANIEL A. CARL, AND WILLIAM H. LOWE, OF HANCOCK, MD.

HARNESS.

SPECIFICATION forming part of Letters Patent No. 243,658, dated June 28, 1881.

Application filed May 11, 1881. (Model.)

*To all whom it may concern:*

Be it known that we, JOBE TRUAX, DANIEL A. CARL, and WILLIAM H. LOWE, of Hancock, in the county of Washington and State of Maryland, have invented certain new and useful Improvements in Harness; and we do hereby declare the following to be a full, clear, and exact description of the invention, such as will enable others skilled in the art to which it pertains to make and use it, reference being had to the accompanying drawings, which form part of this specification.

Our invention relates to an improvement in harness; and it consists in attaching to the martingale or check-rein a solid piece of elastic material, such as rubber, by means of clamps, rings, or any suitable devices, and then expanding the rubber inside of the clamp by means of a conical screw, so that there is no danger of the clamp coming off, as will be more fully described hereinafter.

The object of our invention is to produce elastic martingales or check-reins, and to provide the means by which a rubber can be attached to leather straps and other parts of the harness in a such a manner as to form the two practically into one piece.

Figure 1:
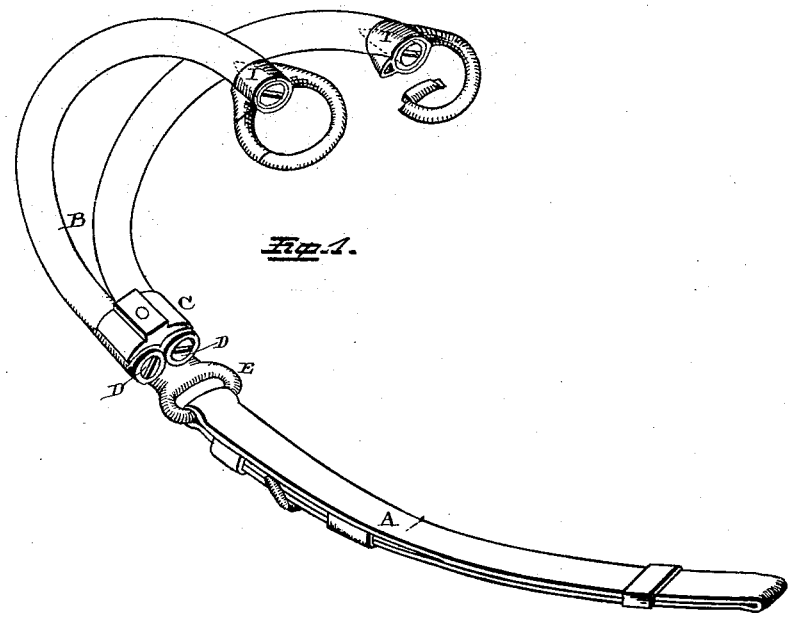
Figure 2:
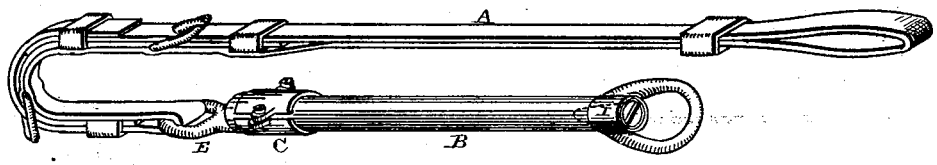

Figure 1 represents a perspective of a martingale for double harness, and Fig. 2 a similar view of a martingale for single harness.

A represents the usual leather strap which passes between the horse's front legs, and is fastened at its rear end to the belly-band, and B an elastic rubber, which is fastened thereto by means of the clamp C. This clamp is composed of two parts, one of which has the ring E formed on its inner end, so that the leather strap A can be fastened to it, and the two parts of the clamp are so shaped on their inner sides as to conform to the shape of the piece or pieces to which they are to be fastened. The piece or pieces of rubber are inserted between the two parts of the clamp, and then they are secured tightly together by means of a screw, which is passed through them. After the two parts of the clamp have been securely tightened together upon the piece or pieces of rubber a conical screw, D, is then screwed down into the end of each part of the rubber, so as to expand it outward against the sides of the clamp in such a manner that it will be almost impossible to separate the two parts.

To the outer end or ends of the rubber B are secured suitable snap-hooks, rings, or other suitable fastenings, all of which are provided with a ferrule, I, to pass over the end of the rubber, and then a conical screw is inserted into the end of the rubber so as to expand the rubber, as above described.

Where a martingale for single harness is to be formed, both of the ends of the rubber will be provided with snap-hooks, as here shown, so that the martingale will be readily attached and detached from the reins at any time.

Where the martingale is made for double harness, any suitable ring or attachment will be fastened to the end of the hook, as above described.

Where our invention is to be applied to check-reins, the rubber will be connected to the strap or straps which pass up over the horse's head, and to a strap which hooks upon the saddle, by means of suitable clamps, which are connected to the ends of the rubber in the same manner. This same method of attachment will be used in connection with other parts of harness, if so desired.

Having thus described our invention, we claim—

1. In a martingale, the combination of a strap, A, the rubber B, clamp C, having the loop E formed on its rear edge to receive the strap, the expanding-screws, and snap-hooks, substantially as shown.

2. As an improved article of manufacture, a martingale composed of a piece or pieces of rubber, B, which are provided with snap-hooks at their outer ends, and a clamp and loop at their inner ends, as a means of attachment to the other parts of the harness, substantially as set forth.

In testimony whereof we affix our signatures in presence of two witnesses.

JOBE TRUAX.
    DANIEL A. CARL.
    WILLIAM H. LOWE.

Witnesses:
 GEORGE W. TRIMBLE,
 MARTIN A. PRICE.